(12) United States Patent
Lipka et al.

(10) Patent No.: US 9,343,961 B1
(45) Date of Patent: May 17, 2016

(54) ULTRAHIGH VOLTAGE CHARGE PUMP APPARATUS IMPLEMENTED WITH LOW VOLTAGE TECHNOLOGY

(71) Applicants: Ronald J. Lipka, Northborough, MA (US); Akhil K. Garlapati, Lexington, MA (US)

(72) Inventors: Ronald J. Lipka, Northborough, MA (US); Akhil K. Garlapati, Lexington, MA (US)

(73) Assignee: Qualtre, Inc., Marlborough, MA (US)

( * ) Notice: Subject to any disclaimer, the term of this patent is extended or adjusted under 35 U.S.C. 154(b) by 0 days.

(21) Appl. No.: 14/486,571

(22) Filed: Sep. 15, 2014

Related U.S. Application Data

(60) Provisional application No. 61/877,539, filed on Sep. 13, 2013.

(51) Int. Cl.
  *G05F 1/10* (2006.01)
  *H02M 3/07* (2006.01)

(52) U.S. Cl.
  CPC ...................... *H02M 3/07* (2013.01)

(58) Field of Classification Search
  CPC . H02M 3/07; H02M 3/073; H02M 2003/075; H02M 2003/078
  See application file for complete search history.

(56) References Cited

U.S. PATENT DOCUMENTS

| | | | | |
|---|---|---|---|---|
| 5,489,870 A | * | 2/1996 | Arakawa | G11C 5/145 327/337 |
| 5,982,224 A | * | 11/1999 | Chung | H02M 3/073 307/110 |
| 6,075,402 A | * | 6/2000 | Ghilardelli | H02M 3/073 327/536 |
| 6,208,200 B1 | * | 3/2001 | Arakawa | H02M 3/073 327/534 |
| 6,603,346 B2 | * | 8/2003 | Sawada | H02M 3/073 327/536 |
| 6,888,400 B2 | * | 5/2005 | Lin | H02M 3/073 327/536 |
| 6,914,791 B1 | * | 7/2005 | Park | H02M 3/073 327/536 |
| 6,992,522 B2 | * | 1/2006 | Ido | H02M 3/073 327/536 |
| 7,427,891 B2 | * | 9/2008 | Sakurai | H02M 3/07 327/536 |
| 8,508,287 B2 | * | 8/2013 | Kern | H02M 3/073 327/536 |
| 8,947,158 B2 | * | 2/2015 | Watanabe | H02M 3/073 327/536 |

* cited by examiner

*Primary Examiner* — Jeffrey Zweizig
(74) *Attorney, Agent, or Firm* — Burns & Levinson LLP; Bruce D. Jobse

(57) ABSTRACT

An charge pump architecture capable of generating ultra high DC voltages but implemented in low voltage CMOS technology uses a cascade of NMOS stages with the bulk terminal of the latter stages biased to a voltage just below the reverse breakdown of the parasitic bulk diode. The bias voltage is tapped from a lower voltage point within the charge pump. The upper limit of the output voltage is then increased to the maximum allowable oxide voltage plus the parasitic diode reverse bias breakdown voltage.

24 Claims, 3 Drawing Sheets

ULTRAHIGH VOLTAGE CHARGE PUMP APPARATUS IMPLEMENTED WITH LOW VOLTAGE TECHNOLOGY

RELATED APPLICATIONS

This application claims priority to U.S. Provisional Patent Application Ser. No. 61/877,539 filed on Sep. 13, 2013, entitled, Ultrahigh Voltage Charge Pump Apparatus Implemented In CMOS Technology, the entire subject matter of which is incorporated herein by this reference for all purposes.

FIELD OF THE INVENTION

The disclosure relates to electronic circuitry, and, more particularly, to high voltage charge pumps.

BACKGROUND

High voltage charge pumps are needed in a variety of applications. One known prior art architecture is the Dickson charge pump, illustrated schematically FIG. 1, which must be implemented with high voltage components in order to achieve ultra high voltage levels. Such architecture requires extra die area and expensive fabrication costs to implement in a high voltage technology in an integrated circuit.

Accordingly, a need exists for a technique to achieve ultra high DC output voltage levels, higher than the output voltage levels traditionally available from a Dickson charge pump architecture.

A further need exists for a charge pump architecture capable of producing ultra high output voltage levels but implemented with standard low voltage technology components.

SUMMARY OF THE INVENTION

Disclosed herein is an ultra high voltage charge pump architecture capable of generating ultra high DC voltages but implemented in standard low voltage CMOS technology. "Ultra" as used herein means that the voltage level exceeds the reverse breakdown voltage of the parasitic diode to bulk substrate for the particular fabrication technology. The disclosed charge pump uses a cascade of NMOS stages with the bulk terminal of the latter stages biased to a voltage just below the reverse breakdown of the parasitic bulk diode. This bias voltage is tapped from a lower voltage point within the charge pump. The upper limit of the output voltage is then increased to the maximum allowable oxide voltage plus the parasitic diode reverse bias breakdown voltage.

According to one aspect of the disclosure, a charge pump apparatus comprises: a plurality of stages sequentially interconnected between an input node and an output node, each of the plurality of stages implemented with a transistor having a bulk diode with a reverse breakdown voltage, wherein one of the plurality of stages has a bulk diode at an operational voltage below the reverse breakdown voltage, wherein the bulk diodes of others of the plurality of stages between said one stage and the output node are biased with a voltage below their respective reverse breakdown voltages.

According to another aspect of the disclosure, a charge pump apparatus comprises: a plurality of stages serially interconnected in a sequence between an input node and an output node, each of the plurality of stages implemented with a transistor having a bulk diode with a reverse breakdown voltage; and wherein at least one stage in a latter portion of the sequence has a bulk diode biased with a bias voltage from an earlier stage of the sequence. In one embodiment, such bias voltage is below the reverse breakdown voltage. In one embodiment, a plurality of stages in the latter portion of the sequence have bulk diodes biased with a bias voltage from an earlier stage of the sequence.

According to still another aspect of the disclosure, a method of generating ultrahigh voltages low voltage comprises: a) providing a plurality of stages interconnected in a sequence between an input node and an output node, each of the plurality of stages implemented with a transistor having a bulk diode with a reverse breakdown voltage; and b) biasing the bulk diode of at least one stage in a latter portion of the sequence with a voltage below the reverse breakdown voltage. In one embodiment b) comprises: b1) biasing the bulk diodes of a plurality of stages in the latter portion of the sequence.

BRIEF DESCRIPTION OF THE DRAWINGS

Embodiments of the disclosed subject matter are described in detail below with reference to the following drawings in which.

DETAILED DESCRIPTION

Figure 1:
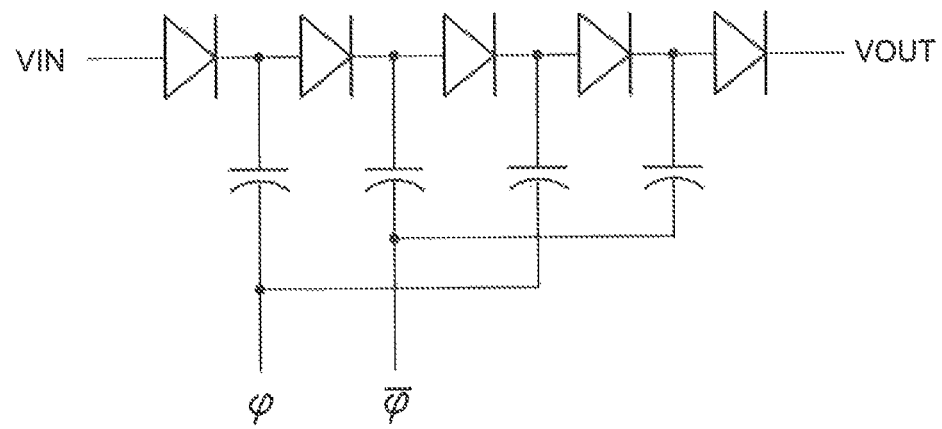
FIG. 1 illustrates schematically a prior art three stage Dickson charge pump circuit.

FIG. 1 illustrates schematically a prior art three stage Dickson charge pump using diodes and pumping capacitors alternately driven by a clock signal, ϕ, and the inverse of the clock signal. The voltage output of the Dickson charge pump illustrated in FIG. 1 will typically not exceed the breakdown voltage of the last diode in the sequence before the circuit output node.

Figure 2:
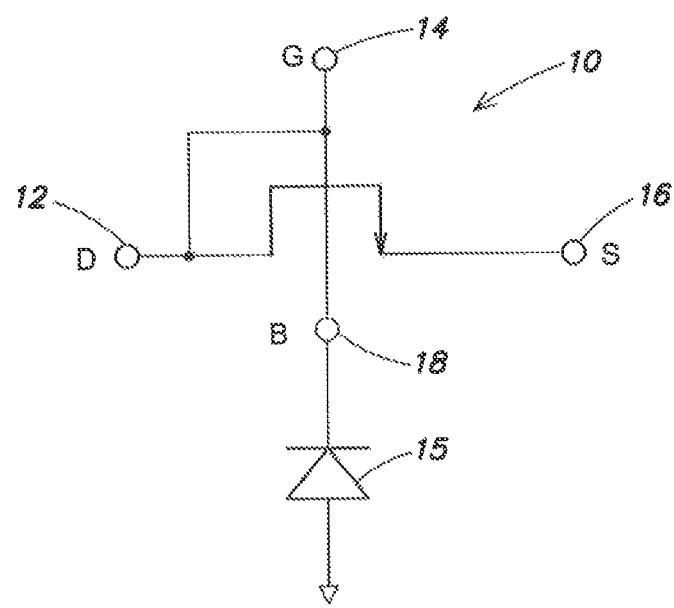
FIG. 2 illustrates schematically a NMOSFET transistor configuration which may be used with the charge pump of FIG. 4 in accordance with the disclosure.
Figure 3:
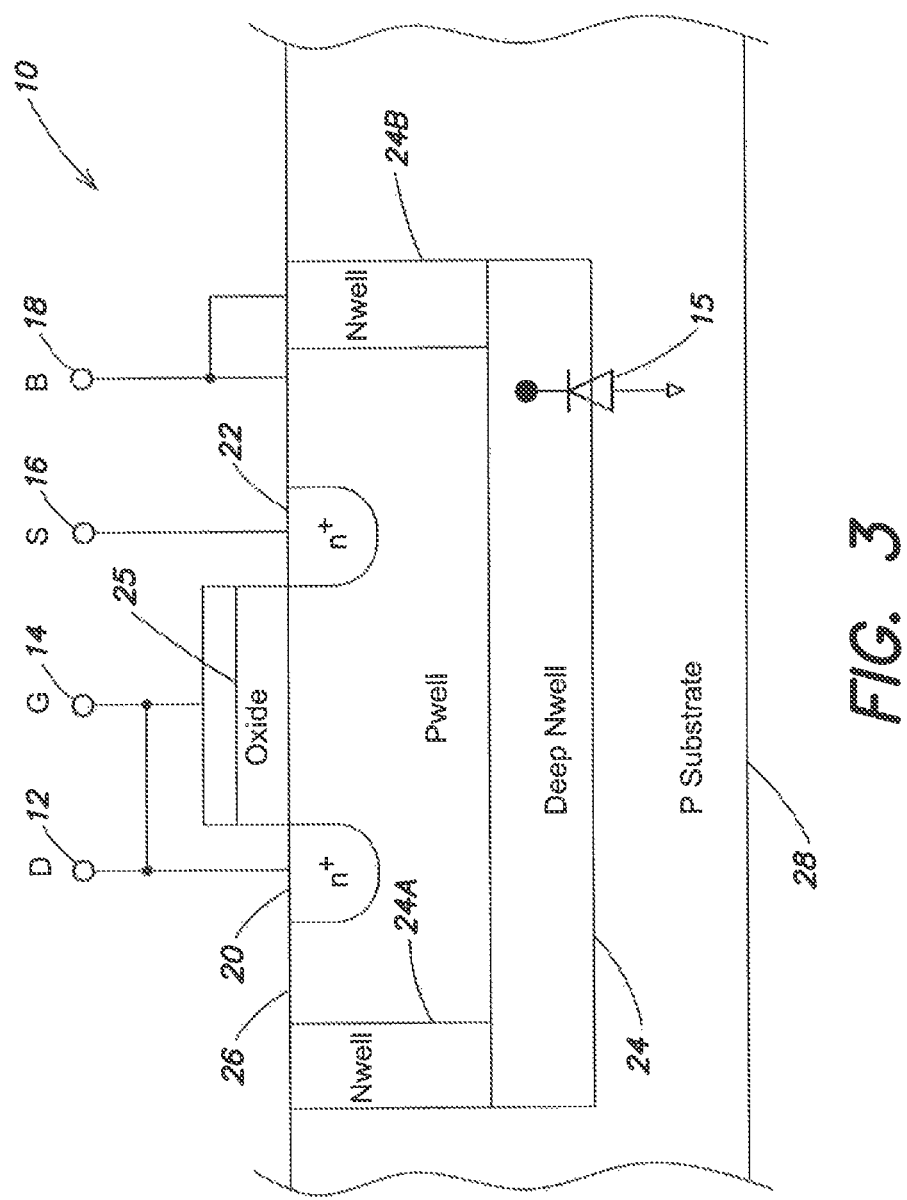
FIG. 3 illustrates conceptually a cross-sectional layout of the semiconductor materials used to implement the NMOSFET transistor of FIG. 2 in accordance with the disclosure.
Figure 4:
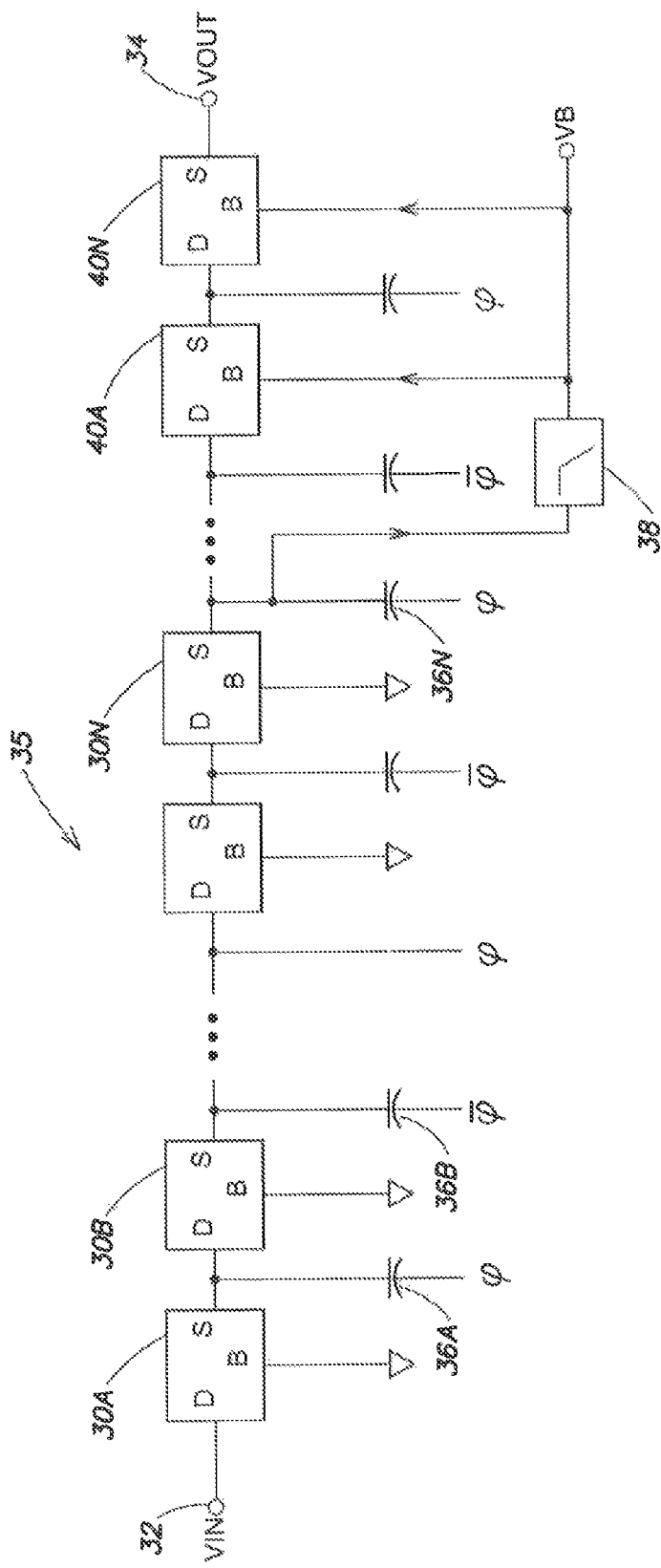
FIG. 4 illustrates a multi-stage charge pump in accordance with the disclosure.

FIG. 2 illustrates schematically a N-type Metal-Oxide-Semiconductor Field Effect Transistor (NMOSFET) transistor 10 which may be used to implement the stages of the charge pump 30 of FIG. 4. As illustrated, transistor 10 has a drain node 12, gate node 14, source node 16, bulk node 18, and a diode 15 coupled intermediate node 18 and ground, as illustrated. In the illustrative embodiment, the diode 15 is a parasitic bulk diode, as illustrated in FIG. 3, having a reverse breakdown voltage that functions to limit the maximum charge pump output.

FIG. 3 illustrates conceptually a cross-sectional diagram of the NMOSFET transistor 10 of FIG. 2 as may be implemented with Complementary Metal Oxide (CMOS) fabrication technology and materials for a single stage of the charge pump 35 in accordance with the disclosure. As illustrated, transistor 10 may be implemented with a pair of n+ doped regions 20 and 22 serving as drain node 12 and source node 16, respectively, which are isolated from each other and from deep N well region 24 by a P well region 26. A p substrate region 28 surrounds deep N well region 24. Oxide layer 25 is disposed intermediate regions 20 and 22 and serves as gate node 14 which is electrically coupled to drain node 12. Bulk node 18 is electrically coupled to both deep N well region 24 and a P well region 26. Note that deep N well region 24 may be comprise a pair of sections 24A and 24B which couple the main body of the deep N well region 24 to the surface of the transistor. Diode 15 comprises the juncture between deep N well region 24 and p substrate region 28.

FIG. 4 illustrates schematically a multistage charge pump 35 which comprises a plurality of sequentially interconnected, alternatingly clocked stages extending intermediate a charge pump input node 32 and a new charge pump output node 34. In the illustrative embodiment, the multiple stages of charge pump 35 can be subdivided into a first plurality of stages 30A-N and a second plurality of stages 40A-N. All of stages 40A-N may be implemented with transistors fabricated with deep n-wells, e.g. "twin well" technology, similar to those illustrated in FIGS. 2-3 herein. As illustrated, except for the first and last stages of charge pump 35, the source node 16 of a stage y is connected to the drain node 12 of the next sequential adjacent stage y+1, with signal flow moving sequentially through the interconnected stages from the charge pump input node 32 to the charge pump output node 34. Also as illustrated in FIG. 4, the interconnected source and drain nodes of adjacent stages are coupled to one of the plurality of pumping capacitors 36. As illustrated, capacitors 36 are coupled to either clock signal so or the inverse thereof, so that adjacent capacitors are simultaneously driven by opposite phased clock signals. In this manner, depending on the phase of the clock signal, only half of the total number stages within charge pump 35 are being driven and actively increasing the charge between input node 32 and output node 34 at any given clock signal phase.

Referring again to FIG. 4, the first plurality of stages 30A-N are arranged in a sequential cascade so that, during operation, the bulk diode 15 of stage 30N is below its respective breakdown voltage. Thereafter, the second plurality of stages 40A-N, also arranged in a sequential cascade, have their respective bulk nodes 18 biased to a voltage just beneath the reverse breakdown voltage of their respective diodes 15 by taking a bias voltage from earlier transistor stage 30N of the first plurality of stages, thereby enabling the output voltage of charge pump 35 to exceed the reverse bias breakdown voltage of the parasitic bulk diode 15 in each of the second plurality of stages. Such biasing of the second plurality of stages is achieved with a filter 38 having an input coupled to the source node 16 of stage 30N. The filtered signal present at the output node of filter 38 is then provided to the bulk node 18 of each of the subsequent stages 40A-N in parallel. The filter 38 may be implemented with a simple resistor capacitor design, the exact filtering characteristics of which may depend on the noise characteristics of the signal provided thereto. By biasing the bulk nodes 18 of each of the second plurality of stages 40A-N, the upper limit of the output voltage for the charge pump 35 is then increased to the maximum allowable oxide voltage plus the parasitic diode reverse breakdown voltage that is present on all stages. In a 3V technology implementation of the illustrative embodiment, the sum of the maximum allowable oxide voltage plus the parasitic diode reverse bias breakdown voltage has been shown to be approximately 50% higher than just the diode reverse bias breakdown voltage, which is typically the limit for high voltage charge pumps implemented with standard low voltage CMOS technology.

The reader will appreciate that the disclosed charge pump achieves ultra high output voltage levels while still using standard low voltage CMOS technology, thereby avoiding the extra die area and expensive fabrication costs that would be incurred if implemented with high voltage technology.

It will be obvious to those reasonably skilled in the art that modifications to the apparatus and process disclosed here in may occur, including substitution of various component values or nodes of connection, without parting from the true spirit and scope of the disclosure. For example, the circuit described herein may be implemented on an ASIC or formed with discrete components or any combination thereof to realize the system disclosed herein. In addition, although the illustrative embodiment of the multistage charge pump disclosed herein has been described with reference to an NMOS or CMOS fabrication technologies, other semiconductor fabrication technologies or discrete electronic technologies may be utilized to implement equivalent architectures to obtain similar results.

What is claimed is:

1. A charge pump apparatus comprising:
a plurality of stages serially interconnected in a sequence between an input node and an output node, each stage of the plurality of stages implemented with a transistor having a bulk diode with a reverse breakdown voltage characteristic value;
wherein each stage in a latter sub-plurality of sequential stages of the sequence has a bulk diode biased with a same bias voltage received from an output of a stage not in the latter sub-plurality of sequential stages.

2. The charge pump apparatus of claim 1 wherein the bias voltage applied to the latter sub-plurality of stages is below the reverse breakdown voltage characteristic value.

3. The charge pump apparatus of claim 1 wherein the respective transistors of each stage of the plurality of stages comprises an oxide layer that serves as a gate node for the transistor and wherein an upper limit of a voltage at the output node may be equal to or less than a sum of a maximum allowable oxide voltage plus the reverse breakdown voltage characteristic value.

4. The charge pump apparatus of claim 1 wherein a first stage of the plurality of stages has a transistor with a drain node coupled to the input node and a last stage of the plurality of stages has a transistor with a source node coupled to the output node.

5. The charge pump apparatus of claim 4 wherein other stages, other than the first and the last stages, have a transistor with a drain node coupled to a source node of an adjacent stage.

6. The charge pump apparatus of claim 2 wherein selected stages have a transistor with a drain node coupled to a clock signal.

7. The charge pump apparatus of claim 6 wherein selected stages have a transistor with a drain node coupled to an inverse clock signal.

8. The charge pump apparatus of claim 2 wherein the bias voltage comprises a clock signal.

9. The charge pump apparatus of claim 1, wherein each of the bulk diodes in a former sub-plurality of sequential stages of the sequence is operationally biased with a same first operational bias voltage,
wherein the former plurality does not overlap with the latter plurality.

10. The charge pump apparatus of claim 9, wherein the stages are arranged in a sequence from 1 to M and wherein:
the former sub-plurality of stages includes stages 1 to j, where 1<j<M;
the latter sub-plurality of stages includes stages j+1 to M; and
each stage in the latter sub-plurality of stages receives the bias voltage from the $j^{th}$ stage.

11. A charge pump apparatus comprising:
a plurality of stages sequentially interconnected between an input node and an output node, each stage of the plurality of stages implemented with a transistor having a bulk diode with a reverse breakdown voltage characteristic value,
wherein one of the plurality of stages has a bulk diode biased at an operational bias voltage set below the reverse breakdown voltage characteristic value, and
wherein each of the bulk diodes of the plurality of stages between said one stage and the output node is biased with a same bias voltage value set below the reverse breakdown voltage characteristic value received from an output of said operationally biased stage.

12. A method of generating ultrahigh voltages with low voltage components comprising:
a) providing a plurality of stages interconnected in a sequence between an input node and an output node, each stage of the plurality of stages implemented with a transistor having a bulk diode with a reverse breakdown voltage characteristic value; and
b) biasing each of the bulk diodes of the stages in a latter sub-plurality of sequential stages of the sequence with a same bias voltage received from an output of a stage not in the latter sub-plurality of sequential stages.

13. The method of claim 12 wherein the bias voltage applied to the latter sub-plurality of stages is below the reverse breakdown voltage characteristic value.

14. The method of claim 12 wherein the respective transistors of each stage of the plurality of stages comprises an oxide layer that serves as a gate node for the transistor and wherein an upper limit of a voltage at the output node may be equal to or less than a sum of a maximum allowable oxide voltage plus the reverse breakdown voltage characteristic value.

15. The method of claim 12 wherein a first stage of the plurality of stages has a transistor with a drain node coupled to the input node and a last stage of the plurality of stages has a transistor with a source node coupled to the output node.

16. The method of claim 15 wherein other stages, other than the first and the last stages, have a transistor with a drain node coupled to a source node of an adjacent stage.

17. The method of claim 12 wherein selected stages have a transistor with a drain node coupled to a clock signal and wherein the bias voltage comprises the clock signal.

18. The charge pump apparatus of claim 11, wherein the plurality of stages are arranged in a sequence from 1 to M and wherein:
a first sub-plurality of stages includes stages 1 to j, where $1<j<M$; and
the one stage having the bulk diode biased at the operational voltage is the $j^{th}$ stage.

19. The charge pump apparatus of claim 18, wherein each of the bulk diodes of the stages 1 to j is biased at the operational bias voltage.

20. The method of claim 12, further comprising:
a1) operationally biasing the bulk diodes in each of the stages not in the latter sub-plurality of stages at an operational bias voltage set below the reverse breakdown voltage characteristic value.

21. A charge pump apparatus comprising:
a plurality of stages, each stage having an input and an output, sequentially interconnected and arranged in a series from 1 to M between an input node and an output node, each stage of the plurality of stages implemented with a transistor having a bulk diode with a reverse breakdown voltage characteristic value;
each of the bulk diodes of the stages 1 to j, where $1<j<M$, configured to receive a same operational bias voltage; and
each of the bulk diodes of the stages j+1 to M coupled to the output of stage j to receive a same bias voltage therefrom.

22. The charge pump apparatus of claim 21, wherein each of the bulk diode voltages of the stages 1 to j is configured to receive the operational bias voltage set to a value below the reverse breakdown voltage characteristic value.

23. The charge pump apparatus of claim 21, further comprising:
a filter to couple the output of stage j to each of the bulk diodes of the stages j+1 to M.

24. The charge pump apparatus of claim 23, wherein:
for each stage k, where $2 \le k \le M-1$, an input of a stage k is coupled to an output of a stage k−1.

* * * * *